April 19, 1932. J. H. BROWNE 1,855,092
HEATING PAD
Filed July 14, 1931 2 Sheets-Sheet 1

James H. Browne
INVENTOR
BY Victor J. Evans
and Co. ATTORNEY

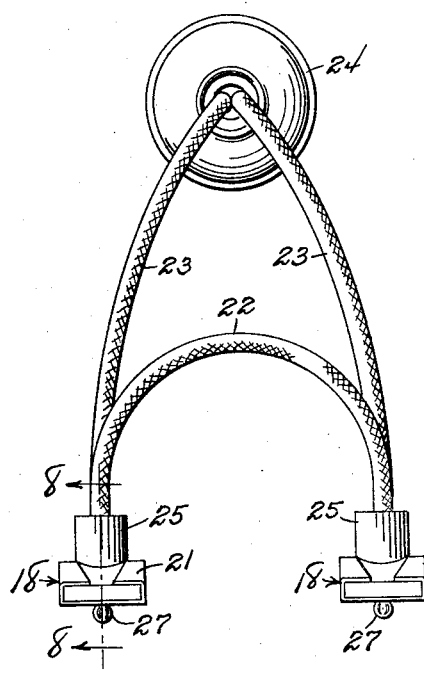
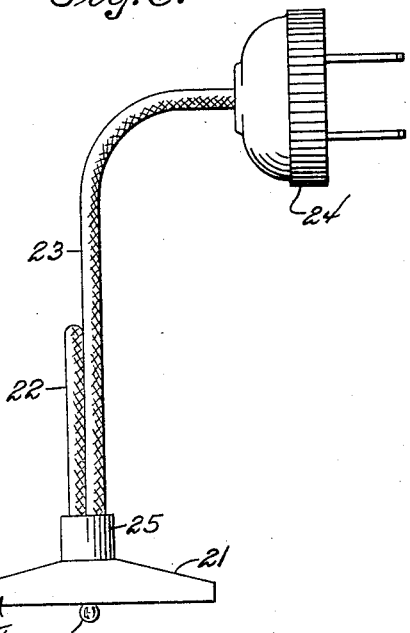
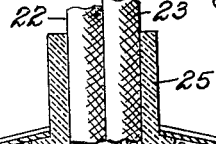
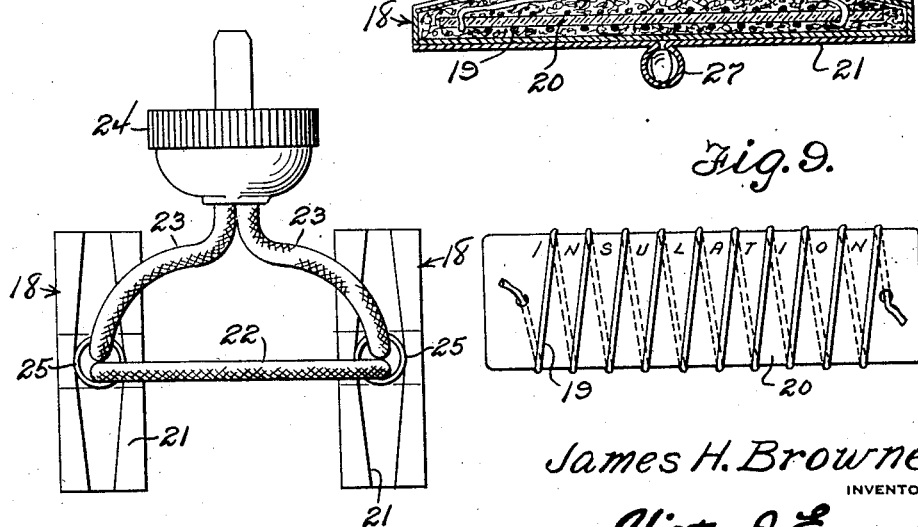
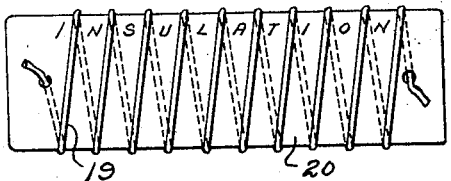

Patented Apr. 19, 1932

1,855,092

UNITED STATES PATENT OFFICE

JAMES H. BROWNE, OF EAST LIVERPOOL, OHIO

HEATING PAD

Application filed July 14, 1931. Serial No. 550,803.

The invention relates to heating pads and more especially to vulcanizing pads designed for use in vulcanizing rubber tires for vehicles.

The primary object of the invention is the provision of a pad of this character wherein a heating element may be adjustably connected therewith so that the heat will be distributed over an area being vulcanized and also such heat can be intensely located with respect to a determined part to be treated by heat and the pad being susceptible of self adjustment to closely and evenly engage the surface of a tire irrespective of the shape over which the pad lies and that portion of such tire being treated.

Another object of the invention is the provision of a pad of this character wherein the heating element is of such construction that it can be detachably joined with the pad at any point throughout the major portion thereof so as to localize heat therefrom and the pad being of such construction as to distribute the heat evenly and quickly without regard to the conformation thereof under its adjustment to a part to be treated by vulcanization.

A further object of the invention is the provision of a pad of this character wherein the construction of the pad proper is novel in form and likewise the heating element is of novel construction so as to make a positive connection with the pad without liability of accidental displacement thereof for transmitting heat thereto and also for determined localization of such heat when the occasion requires.

A still further object of the invention is the provision of a pad of this character which is extremely simple in construction, freely flexible to assure a true fitting thereof, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 5 is an elevation of the heating element.

Figure 6 is a side elevation thereof.

Figure 7 is a plan view.

Figure 8 is an enlarged fragmentary sectional view on the line 8—8 of Figure 5.

Figure 9 is a detail plan view of one of the heating units removed from its housing showing the insulation block or plate.

Similar reference characters indicate corresponding parts throughout the several views in the drawings.

Figure 1:
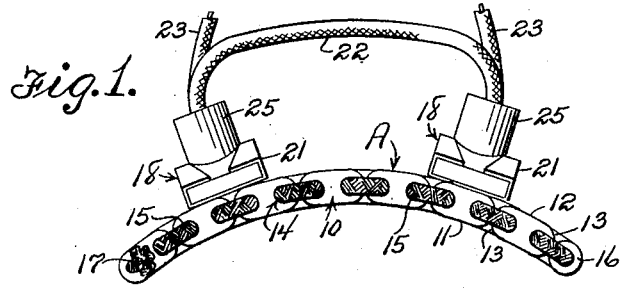
Figure 1 is an edge elevation of the pad constructed in accordance with the invention showing the heating element associated therewith.
Figure 2:
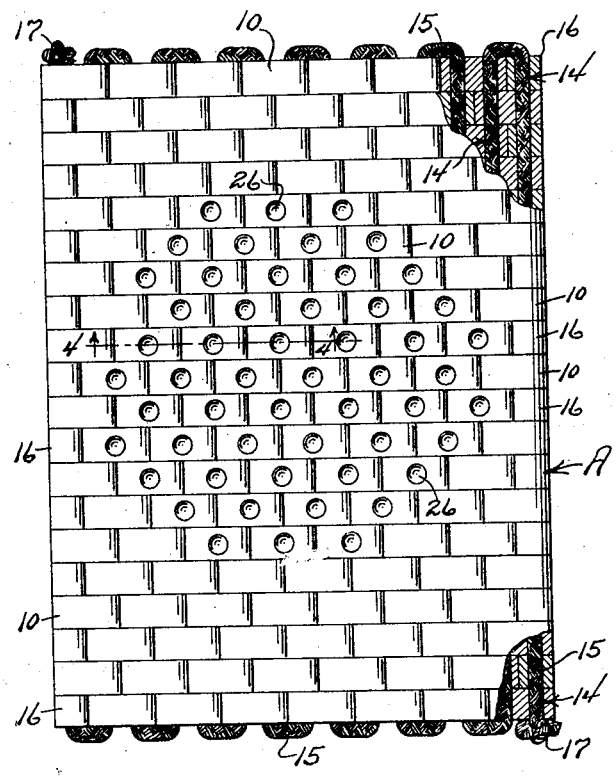
Figure 2 is a plan view of the pad.
Figure 3:
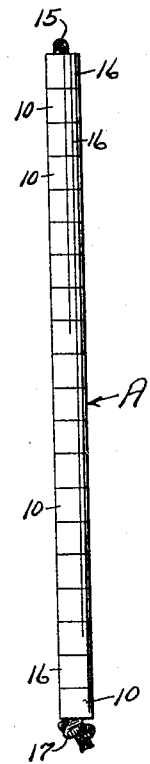
Figure 3 is an edge elevation looking toward one longer edge of said pad.
Figure 4:
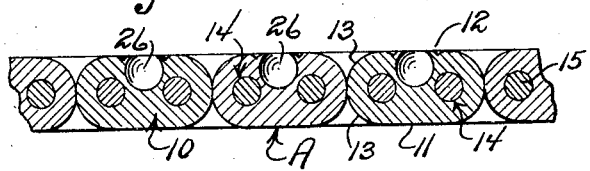
Figure 4 is an enlarged fragmentary sectional view on the line 4—4 of Figure 1 looking in the direction of the arrows.

Referring to the drawings in detail, the pad comprises a flexible or bendable metallic body A which may be of any desirable size and preferably of rectangular shape and includes a plurality of links 10, each formed with a flattened face 11 and a corrugated opposite face 12 with rounded ends 13. These links 10 are preferably of the shape as shown in Figure 4 of the drawings and are held in staggered relation to each other in parallel rows in the assembly of the pad by threading through their openings or holes 14 therein a flexible wire or other metallic member 15, it being preferable to have the wire made up of a plurality of twisted strands of comparatively thin wires. The links 10 have in association therewith at opposite longer edges only filler links 16 which are alternately arranged along the said longer edges of the pad so as to present a smooth flush edging to the pad at the longer sides thereof.

The wire 15 is provided at each end with a suitable anchoring terminal 17 in this instance being in the form of a notch made from said wire although it may be otherwise fitted with a retaining terminal. The wire 15 provides a pivotal connection between links adjacent each other of the plurality of rows thereof, so that the pad in its entirety may be readily flexed or bent to closely engage the piece of work or the surface of a tire on the application of the pad thereto for vulcanizing of the same. The links 10 in their arrangement are given sufficient play so that each row of links may be moved relatively to its adjacent row, thus augmenting the bending or flexing of the pad in a direction transverse to the tire, sufficient flexibility being provided to bend or flex the pad circumferentially of the said tire.

The pad A in its entirety is especially useful in vulcanizing a tire when the pad must extend partially upon the tread and partially along one side wall of the same and it will closely engage the face or surface of the tire irrespective of the location of the part or portion thereof to be vulcanized.

Associated with the pad A to apply heat thereto and for the distribution of such heat throughout the entire pad body there is a heating element, which comprises a pair of elongated flat faced shoes 18, each in the form of a housing inclosing a heating coil or unit 19, the latter being carried by an insulation plate 20 which is arranged lengthwise in the housing and incased by an insulating lining or packing 21 preferably asbestos, the latter being confined by the housing.

The heating units or coils 19 are adapted to be included in a circuit with a source of current and for this purpose are connected in their pair with conductors 22 and 23 respectively, the latter being of any suitable length and having associated therewith a socket plug 24 insertable in a switch socket of the current source of supply. The conductors 22 and 23 are trained through insulation thimbles 25 mounted on the housing 21 medially thereof and these thimbles constitute finger holds for the manual engagement of the heating element with the pad in a manner presently described.

The conductors 22 and 23 not only provide for the passage of electric current but also provide a flexible connection between the elongated shoes 18. By flexibility these shoes 18 may be spaced apart at the option of the user of the pad so as to apply heat at spaced points thereof and the heat from said shoes will be distributed throughout the links 10 and the metallic member 15, which latter will carry the heat from one link to the other as should be obvious.

Determined links 10 of the pad A and preferably throughout a major portion of the latter in the sides 12 thereof are provided with female substantially ball-shaped sockets 26, while formed on the shoe centrally thereof are substantially ball-shaped male fastening mediums 27, these being adapted for frictional engagement in the sockets 26 for the detachable securing of the shoes with selected links 10 of the pad A and thus in this manner the heating element will be detachably held fast about the pad at determined localities thereon, thus in this manner the heat may be localized accordingly to the work to be treated.

It will be apparent that the heating element including the pair of shoes may be arranged in proper contact with the pad where the latter is placed partially upon the tread and partially upon the side wall of a tire. The shoes 18 may be arranged either longitudinally or transversely with respect to the pad A and in engagement a unitary structure is presented.

What is claimed is:—

1. A heating pad comprising a plurality of pivotally connected links arranged in close parallel rows, certain of said links having sockets therein, and an electric heating element having a shoe provided with a fastening medium for detachably engaging in the socket without retarding flexibility of the links in their pivotal association with each other.

2. A heating pad comprising a plurality of pivotally connected links arranged in close parallel rows, certain of said links having sockets therein, an electric heating element having a shoe provided with a fastening medium for detachably engaging in the socket without retarding flexibility of the links in their pivotal association with each other, and flexible means for the shoe and constituting a source of current supply thereto.

3. In a heating pad, a bendable metallic body having free flexibility, an electric heating shoe for association with the body, and means on the heating devices for detachably coupling the same at elected localities on the body.

4. In a heating pad, a bendable metallic body having free flexibility, electric heating devices for association with the body, and means on the heating devices for detachably connecting the same at elected localities on the body, said heating devices including a plurality of flexibly connected shoes.

5. In a heating pad, a bendable metallic body having free flexibility, electric heating devices for association with the body, means on the heating devices for detachably connecting the same at elected localities on the body, said heating devices including a plurality of flexibly connected shoes, and means for detachably arranging the shoes in an electric current supply.

In testimony whereof I affix my signature.
JAMES H. BROWNE.